US012559327B2

(12) United States Patent
Gonni et al.

(10) Patent No.: US 12,559,327 B2
(45) Date of Patent: Feb. 24, 2026

(54) METHOD AND PLANT TO HANDLE CERAMIC ARTICLES

(71) Applicant: Sacmi Cooperativa Meccanici Imola Societa' Cooperativa, Imola (IT)

(72) Inventors: Paolo Gonni, Imola (IT); Giovanni Nervo, Imola (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 553 days.

(21) Appl. No.: 18/004,870

(22) PCT Filed: Jul. 9, 2021

(86) PCT No.: PCT/IB2021/056190
§ 371 (c)(1),
(2) Date: Jan. 9, 2023

(87) PCT Pub. No.: WO2022/009171
PCT Pub. Date: Jan. 13, 2022

(65) Prior Publication Data
US 2023/0356962 A1     Nov. 9, 2023

(30) Foreign Application Priority Data

Jul. 10, 2020     (IT) ......................... 102020000016834

(51) Int. Cl.
B65G 49/08          (2006.01)
B65G 1/137          (2006.01)
(52) U.S. Cl.
CPC ......... B65G 49/085 (2013.01); B65G 1/1378 (2013.01); B65G 2209/02 (2013.01)
(58) Field of Classification Search
CPC . B65G 49/085; B65G 1/1378; B65G 2209/02
See application file for complete search history.

(56) References Cited

U.S. PATENT DOCUMENTS 5,372,472 A * 12/1994 Winski ................. B65G 47/086
414/789.9
6,658,816 B1 * 12/2003 Parker ................. B65G 57/005
414/788.1
(Continued)

FOREIGN PATENT DOCUMENTS

AT          508361          1/2011
CA          2015747 A1     11/1990
(Continued)

OTHER PUBLICATIONS

International Search Report and Written Opinion for PCT/IB2021-056190 mailed Oct. 8, 2021.
(Continued)

*Primary Examiner* — Kyle O Logan
(74) *Attorney, Agent, or Firm* — Workman Nydegger

(57)          ABSTRACT

A method and plant to handle ceramic articles; the plant comprises a gathering area comprising a plurality of first storage units, each having a group of ceramic articles placed on a first support structure according to a first given arrangement; a handling machine to re-arrange at least part of such ceramic articles on second support structures in such a way that they are placed according to a second given arrangement so that they can be picked up by a holding device, so as to create a plurality of second storage units; at least one first intermediate store to receive at least part of the second storage units; and a forming machine to form an order to be shipped, which is configured to transfer at least one first ceramic article from the second storage unit onto a third support structure so as to obtain a shipment unit.

11 Claims, 5 Drawing Sheets

(56)                References Cited

U.S. PATENT DOCUMENTS

| | | | | |
|---|---|---|---|---|
| 7,547,052 B2* | 6/2009 | Yohe | B65G 47/90 | |
| | | | 294/197 | |
| 9,242,799 B1* | 1/2016 | O'Brien | G05B 15/02 | |
| 2004/0193311 A1* | 9/2004 | Winkler | B65G 1/1378 | |
| | | | 700/216 | |
| 2006/0216138 A1* | 9/2006 | Schaefer | B65G 1/1373 | |
| | | | 414/266 | |
| 2007/0280814 A1* | 12/2007 | Morency | B65G 60/00 | |
| | | | 414/788 | |
| 2009/0299521 A1 | 12/2009 | Hansl et al. | | |
| 2011/0130868 A1* | 6/2011 | Baumann | B65G 61/00 | |
| | | | 700/217 | |
| 2012/0141236 A1* | 6/2012 | Korner | B65G 1/0407 | |
| | | | 414/222.01 | |
| 2012/0150340 A1* | 6/2012 | Suess | B65G 1/1378 | |
| | | | 700/216 | |
| 2012/0245728 A1* | 9/2012 | Koholka | B65G 1/1378 | |
| | | | 700/216 | |
| 2013/0177379 A1* | 7/2013 | Hoffman | B65G 1/00 | |
| | | | 414/800 | |
| 2013/0186044 A1* | 7/2013 | Cremer | B65B 5/10 | |
| | | | 53/473 | |
| 2014/0178161 A1* | 6/2014 | Moosburger | B65G 1/1378 | |
| | | | 414/273 | |
| 2015/0078877 A1 | 3/2015 | Brandmüller et al. | | |
| 2017/0185959 A1* | 6/2017 | Meurer | G06Q 10/0875 | |
| 2019/0263591 A1* | 8/2019 | Fellner | B65G 1/1373 | |
| 2020/0319648 A1* | 10/2020 | Eckman | G01C 21/206 | |
| 2023/0356962 A1* | 11/2023 | Gonni | B65G 49/085 | |

FOREIGN PATENT DOCUMENTS

| | | |
|---|---|---|
| CN | 104039669 A | 9/2014 |
| CN | 109383968 A | 2/2019 |
| CN | 109715527 A | 5/2019 |
| DE | 10119679 A1 | 10/2002 |
| EP | 0396960 A2 | 11/1990 |
| EP | 1462393 | 9/2004 |
| JP | 6661208 B1 | 3/2020 |
| WO | 2008/038081 A1 | 4/2008 |
| WO | 2013092915 | 6/2013 |

OTHER PUBLICATIONS

Office Action received for Russian Patent Application No. 2023101072 , mailed on Jun. 1, 2023, 7 pages.
International Preliminary Report on Patentability received for PCT Patent Application No. PCT/IB21/056190, mailed on Jan. 19, 2023, 11 pages.
Office Action received for Chinese Patent Application No. 202180061606.4, mailed on May 1, 2025, 18 pages (9 pages of English Translation and 9 pages of Original Document).

* cited by examiner

METHOD AND PLANT TO HANDLE CERAMIC ARTICLES

CROSS-REFERENCE TO RELATED APPLICATIONS

This patent application is a 35 U.S.C. § 371 U.S. National Stage of PCT/IB2021/056190 filed Jul. 9, 2021, which claims priority from Italian patent application no. 102020000016834 filed on Oct. 7, 2020. The entire disclosure of each of the aforementioned patent applications is incorporated herein by reference.

TECHNICAL FIELD

The present invention relates to a method and to a plant to handle ceramic articles.

BACKGROUND OF THE INVENTION

In the field of the ceramic processing industry, the ceramic articles leaving the production lines are placed on support structures, for example on pallets, typically stacked on top of one another, and subsequently bound and/or packed so as to obtain storage units which are stored in suitable gathering areas, generally outdoors, from where such storage units are picked up when an order of ceramic articles to be shipped has to be formed.

Specifically, the known methods and plants for handling ceramic articles provide for, whenever an order of ceramic articles to be shipped has to be formed, one or more storage units to be picked up from the gathering area, manually by one or more operators or by means of suitable transfer devices, and to be transported towards an area for opening and sorting the storage units (also called "picking bay"), where an operator, manually or with the help of appropriate equipment (e.g. zero balancer), picks up from each storage unit the number of ceramic articles that has to be shipped and places such ceramic articles on another support structure, for example on a further pallet, in a box, or on a stand, or on a plank, etc., so as to obtain a shipping unit. When the order to be shipped contains ceramic articles of different types, such operations are repeated as many times as is the number of types of ceramic articles which constitute said order.

The preparation of a shipping unit thus requires a certain amount of time, a certain number of transfer devices and a certain number of operators who, with or without the help of appropriate equipment, carry out the actual sorting of the ceramic articles with all of the drawbacks associated with manual work in terms of probability of error, risk of injury of the operators who operate with storage units which have significant weights, labour costs, etc.

The object of the present invention is to provide a plant and a method to handle ceramic articles, which allow overcoming, at least partially, the drawbacks of the prior art and are, at the same time, easy and cost-effective to manufacture.

SUMMARY

In accordance with the present invention, a plant and a method to handle ceramic articles are proposed, as disclosed in the appended independent claims and, preferably, in any one of the claims directly or indirectly dependent on said independent claims.

The claims describe preferred embodiments of the present invention forming integral part of the present description.

BRIEF DESCRIPTION OF THE DRAWINGS

The invention is described in the following with reference to the accompanying drawings, which illustrate some non-limiting example embodiments thereof, wherein.

DETAILED DESCRIPTION

Figure 1:
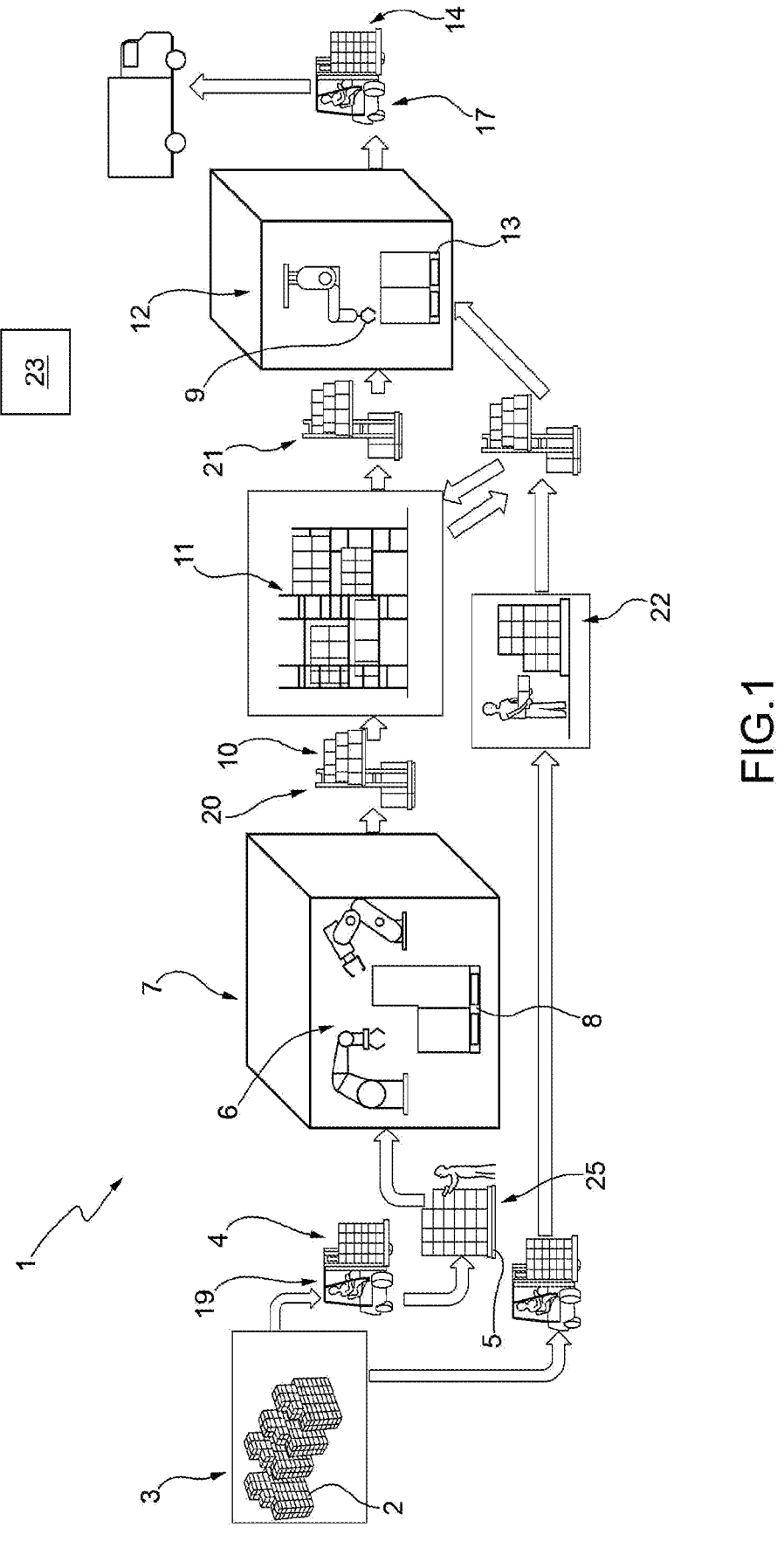
FIG. 1 is a schematic view of a plant to handle ceramic articles in accordance with a first embodiment of the present invention.
Figure 2:
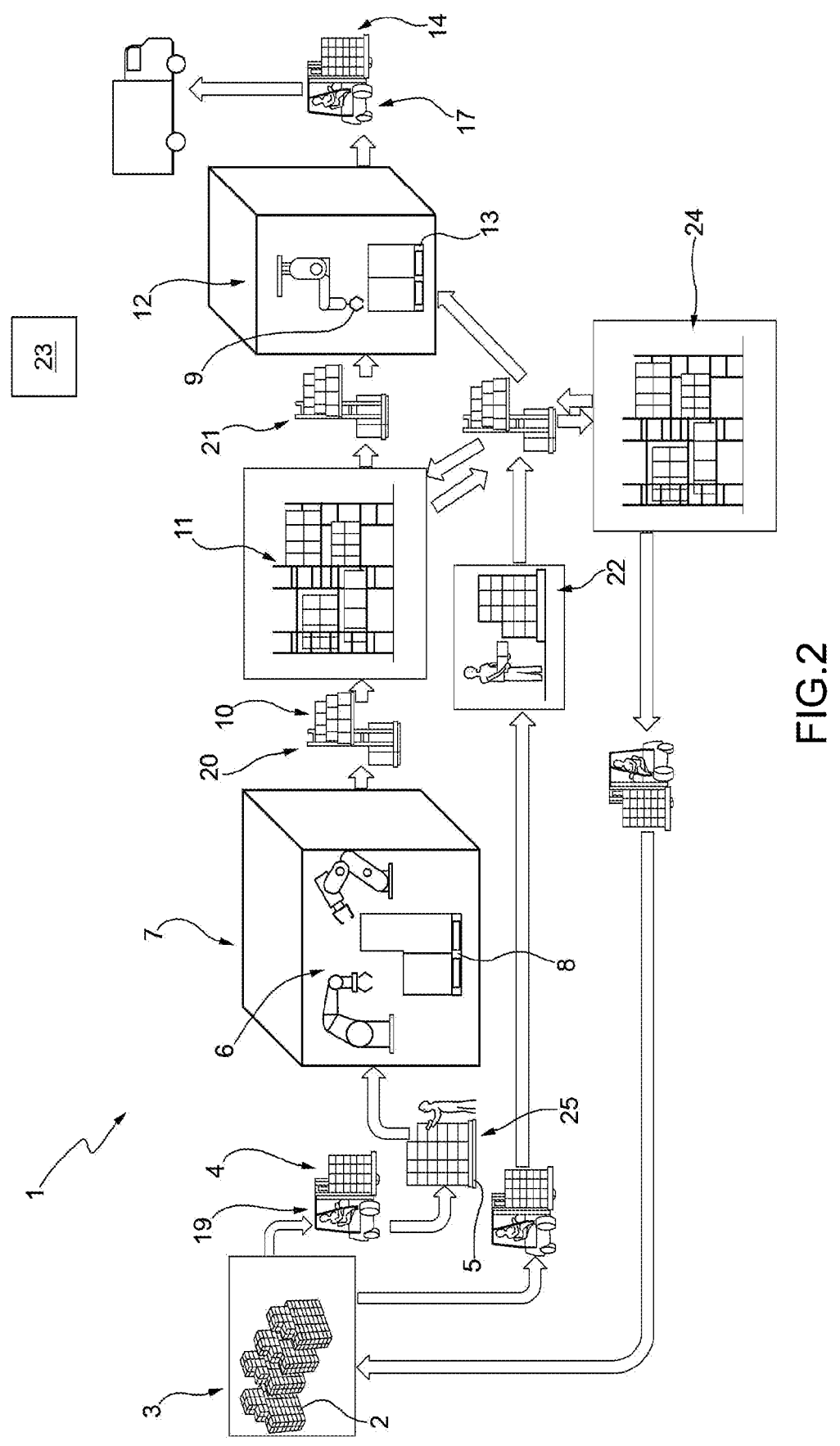
FIG. 2 is a schematic view of a plant to handle ceramic articles in accordance with a second embodiment of the present invention.

In FIGS. 1 and 2, reference numeral 1 indicates, as a whole, a plant to handle ceramic articles 2.

In the present disclosure, the expression "ceramic article 2" is understood to refer to a single ceramic product, for example a single ceramic sheet or a tile, or to a box of ceramic products of the same type, or to a bundle of boxes of ceramic products, or to a plurality of ceramic products of the same type bound together, for example by means of one or more straps or by means of packing wrap.

The plant 1 to handle ceramic articles 2 comprises: a gathering area 3, for example a gathering yard as illustrated in the accompanying figures, said gathering area 3 comprising a plurality of storage units 4, each comprising a support structure 5 and a group of ceramic articles 2 placed on the support structure 5 according to a first given arrangement; and a handling machine 6, which is arranged in the area of a re-arranging station 7, and configured to re-arrange at least part of the ceramic articles 2 of the group of ceramic articles 2 (in particular, all the ceramic articles 2 of the group of ceramic articles 2 which constitutes—which forms—the storage unit 4) on (respective) further support structures 8 (in particular, on at least one further support structure 8) placed according to a second given arrangement, which is different from the first given arrangement (and in such a way that they can be picked up by a holding device 9), so as to create a plurality of storage units 10 (in particular, at least one storage unit 10).

In other words, the handling machine 6 is configured to re-arrange the ceramic articles 2 of the plurality of storage units 4 so as to form further storage units 10, which are different from the storage unit 4 in the number and/or type of ceramic articles 2 and in the mutual position of the ceramic articles 2. Specifically, advantageously but not limitedly, the handling machine 6 is configured to pick up each ceramic article 2 of each storage unit 4 from a respective support structure 5 and place it on a further storage structure 8 so as to form the storage units 10.

In such storage units 10, the ceramic articles 2 are placed in such a way that they can be picked up by a holding device 9 and that they can ensure the stability thereof (in particular, without the help of straps or other locking elements).

Specifically, advantageously but not necessarily, the first given arrangement is such that the ceramic articles 2 occupy the least amount of space possible, for example the ceramic articles 2 in such first given arrangement are placed on the support structure 5 stacked on top of one another and are bound to one another and to the support structure 5, for example by means of a plurality of straps and/or by means of a packing wrap.

Advantageously but not necessarily, in the second given arrangement, the ceramic articles 2 of the storage unit 10 are arranged on the support structures 8 in such a way that they are stable on such support structures 8 (in particular, without the help of straps or other locking elements which fasten them to one another and/or to the respective support structure 8) and so that they can be grabbed laterally by the holding device 9, in particular by a holding device 9 with a horizontal hold.

In other words, in such second given arrangement, the ceramic articles 2 are arranged in relation to one another in such a way that each has at least two free lateral surfaces LS (see FIGS. 3 to 5), so that they can be grabbed by a holding device 9 with a horizontal hold, for example by a lifting clamp, independently of the others.

Advantageously, the plant 1 comprises an intermediate store 11 configured to receive at least a part of the plurality of storage units 10 formed by the handling machine 6; and a forming machine 12 to form an order to be shipped, which is configured to transfer at least one ceramic article 2, in particular a given number of ceramic articles 2, from at least one storage unit 10 onto a support structure 13 so as to obtain a shipping unit 14.

Specifically, according to some non-limiting embodiments (such as those illustrated in FIGS. 3 to 5), the forming machine 12 comprises: a conveyor device 15 to receive and convey the storage unit 10; a conveyor device 16 to receive the support structure 13 and to convey the shipping unit 14 towards an output station 17; and a holding device 9, preferably of the type with a horizontal hold, arranged and configured to pick up the ceramic article 2 from the storage unit 10 and take the ceramic article 2 onto the support structure 13.

It is understood that the holding device 9 could be a holding device 9 of any other type suitable for picking up at least one ceramic article 2, in particular a given number of ceramic articles 2, of a group of ceramic articles 2 independently of the others. For example, when the ceramic article 2 is understood as a ceramic product, the holding device 9 could be a suction holding device 9 having, for example, a plurality of suction cups; or the holding device 9 could be a forked holding device 9, etc.

It is further understood that the second given arrangement can be any arrangement which allows such holding device 9 to pick up each ceramic article 2, in particular independently of the others.

Figure 3:
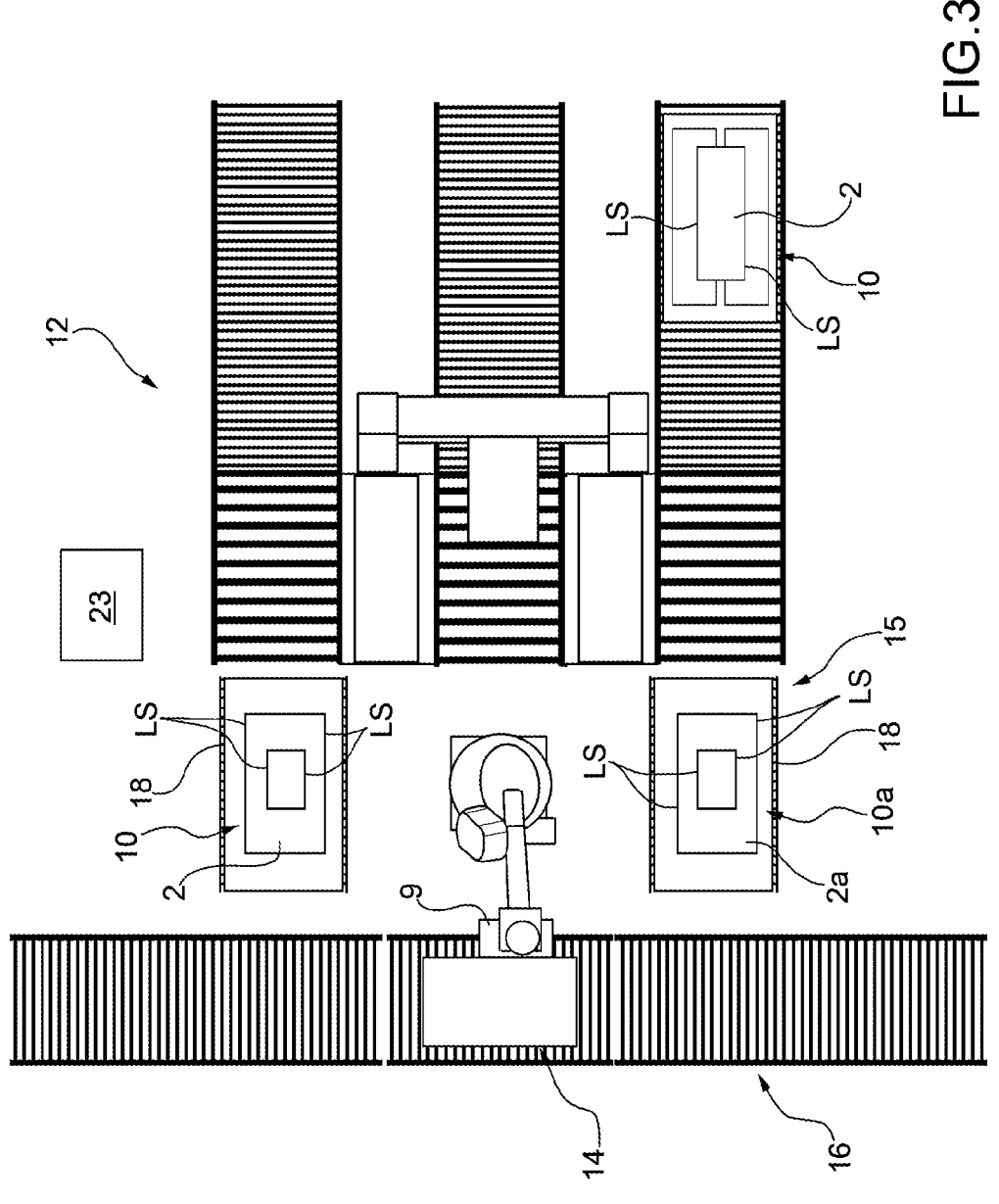
FIG. 3 is a plan view of a forming machine to form an order to be shipped, which is part of the plant shown in FIG. 1 and in FIG. 2.
Figure 4:
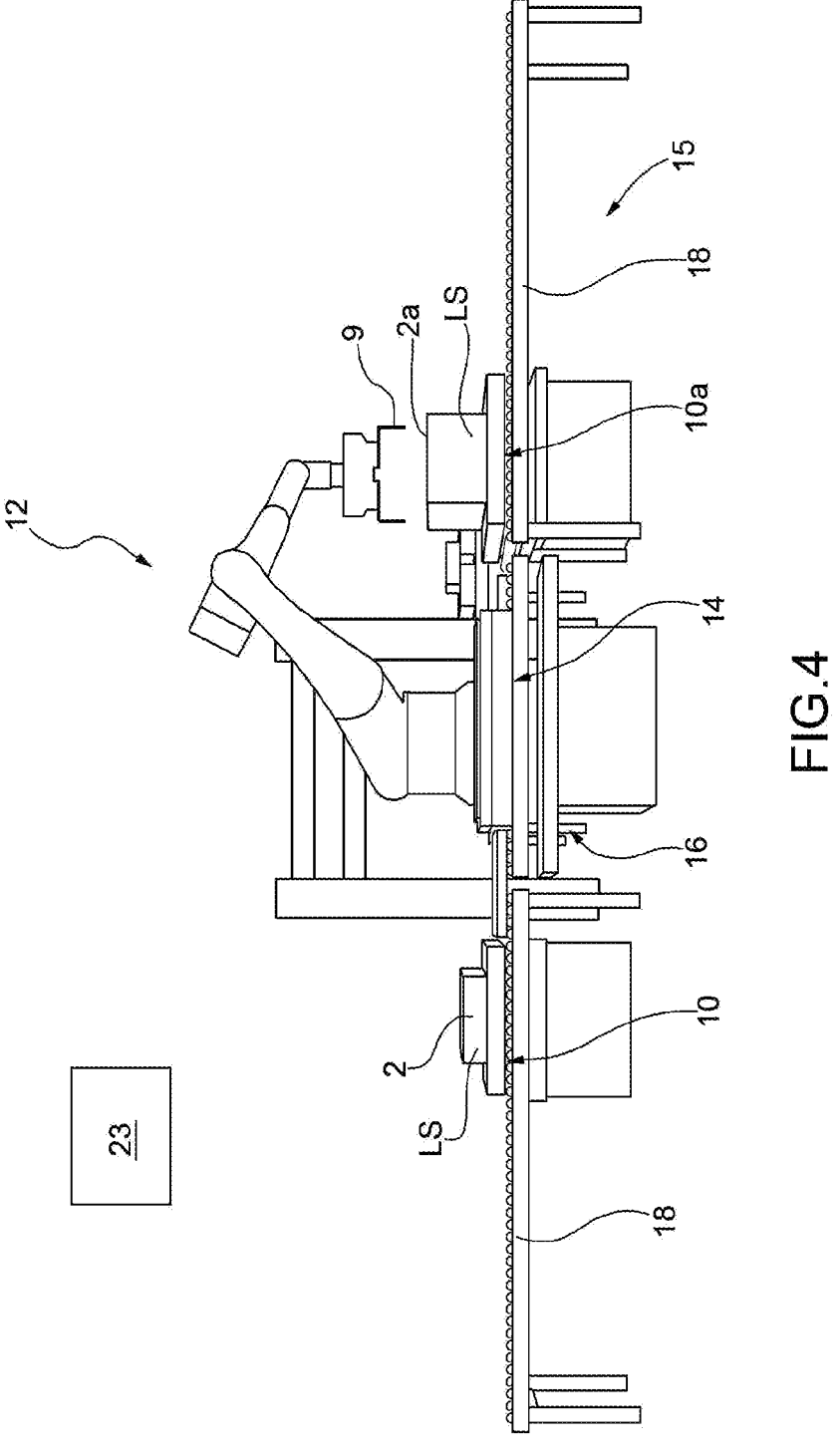
FIGS. 4 and 5 illustrate the forming machine to form an order to be shipped shown in FIG. 3 during two consecutive steps of forming an order to be shipped, in particular during the picking up of a ceramic article from a stack of ceramic articles arranged on a conveyor and during the placing of the ceramic article on a support structure arranged on another conveyor.
Figure 5:
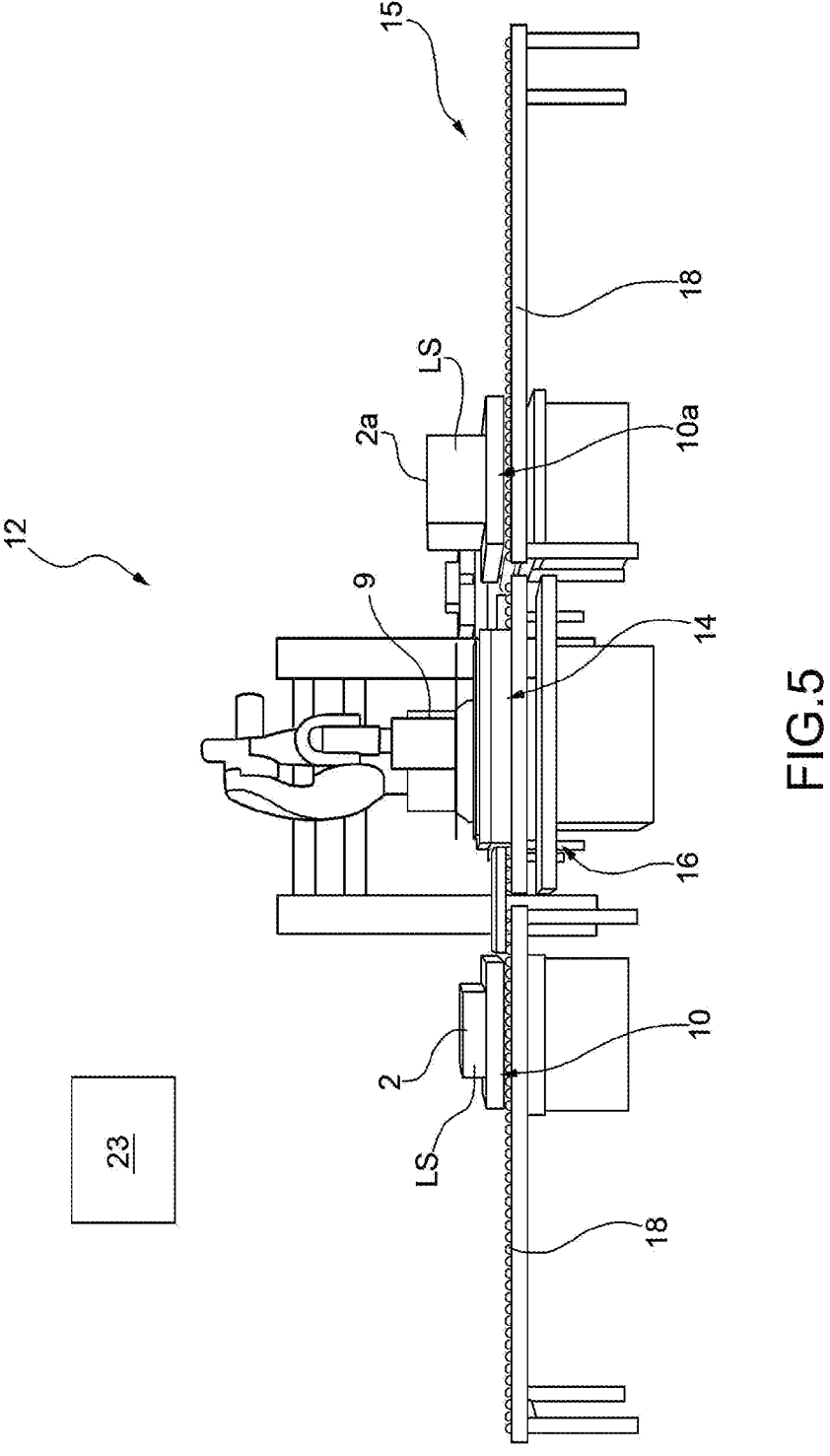

Advantageously but not necessarily (as illustrated in FIGS. 3 to 5), the conveyor device 15 comprises (in particular, consists of) two conveyors 18 arranged facing one another and the sides of the holding device 9 and each intended to receive a storage unit 10 from which, advantageously but not necessarily, the holding device 9 can pick up ceramic articles 2 of different types in order to compose the shipping unit 14.

According to some advantageous but non-limiting embodiments not illustrated, the forming machine 12 comprises a packing device (of known type and not further described herein) to pack the shipping unit 14 before the latter is conveyed towards the output station 17.

In addition, advantageously but not limitedly, (as illustrated in FIG. 1 or 2) the plant 1 comprises: at least one transfer device 19 designed to pick up the storage unit 4 from the gathering area 3 and transfer the storage unit 4 to the re-arranging station 7; a transfer device 20 to transfer the storage unit 10 created in the re-arranging station 7 to the intermediate store 11; and a transfer device 21 to transfer the ceramic article 2 of the storage unit 10, in particular the given number of ceramic articles 2 of the storage unit 10, from the intermediate store 11 to the forming machine 12.

Still more specifically, advantageously but not necessarily, the transfer device 21 transfers the storage unit 10 from the intermediate store 11 to the forming machine 12, which (forming machine 12) is configured to transfer the ceramic article 2, in particular the given number of ceramic articles 2 intended to form the shipping unit 14, onto a support structure 13 so as to obtain a shipping unit 14.

Advantageously but not limitedly, each of such transfer devices 19, 20 and 21 comprises (in particular, is) an automatically or manually driven holding vehicle, or a lift truck, or a forklift, etc.

According to some non-limiting embodiments such as those illustrated in the accompanying figures, the plant 1 additionally comprises a further gathering area 22 intended to receive the part of storage units 4 with a low frequency of use, i.e. the part of storage units 4 containing ceramic articles 2 which are requested with a low frequency to form the orders to be shipped, thus shipping units 14.

Advantageously but not necessarily, the plant 1 also comprises a control unit 23, which is configured to control at least the forming machine 12 and comprises a schedule of the orders to be shipped, said schedule associating each order to be shipped with a composition of ceramic articles 2 to be shipped, in particular with a type of ceramic articles 2 to be shipped and a number of ceramic articles 2 (of each type) to be shipped, and a shipment date, so as to manage to automize the handling of the ceramic articles 2.

According to some advantageous but non-limiting embodiments, the plant 1 also comprises an identification unit (not illustrated) arranged in the area of the gathering area 3 and configured to identify each storage unit 4 picked up from the gathering area 3 and to transfer the data to the control unit 23, so that, as a function of what is detected by the identification unit and of what is contained in the schedule, the storage units 4 are sorted between the re-arranging station 7 and the further gathering area 22.

According to some advantageous but non-limiting embodiments, the control unit 23 is configured to also control the transfer devices 19, 20 and 21, in particular when such transfer devices 19, 20 and 21 are automatic devices, for example automatically driven holding vehicles.

Still according to other non-limiting embodiments (such as the one illustrated in FIG. 2), the plant 1 comprises a further intermediate store 24 to receive part of the storage units 10. In this case, advantageously but not necessarily, the transfer device 20 is configured to transport, in particular as a function of the schedule of the orders to be shipped, some storage units 10 towards the intermediate store 11 and others towards the further intermediate store 24.

Specifically, advantageously but not limitedly, the intermediate store 11 is arranged and configured to contain the storage units 10 intended (based on the schedule) to be used for forming the shipping unit 14 in the days immediately following their creation in the re-arranging station 7, i.e. the storage structures 10 also called "high rotation" storage structures 10 which contain ceramic articles 2 of types requested with a high frequency, which thus, based on the planning of the orders to be processed, are intended to remain (stand) in the intermediate store 11 for brief periods, in the order of 1-2 days; while the further intermediate store 24 is arranged and configured to contain the storage units 10 intended to be used to form the shipping unit 14, based on the planning of the orders to be processed, only after a period of more than at least 2 days as of their creation in the re-arranging station 7, i.e. the storage structures 10 also called "low rotation" storage structures 10 which contain ceramic articles 2 of types requested with less frequency with respect to that with which the ceramic articles 2 arranged in the intermediate store 11 are requested, and thus the storage structures 10 intended to remain (stand) in the intermediate store 24 for a period of more than at least 2 days.

According to non-limiting embodiments not illustrated, the intermediate store 11 and the further intermediate store 24 are different areas of a same intermediate store.

Advantageously but not limitedly, the plant 1 comprises an opening/cutting station 25, arranged immediately upstream of the re-arranging station 7 and in the area of which the storage units 4 are opened manually or by a suitable machine (not illustrated) in order to separate the ceramic articles 2 of the storage unit 4 from the support structure 5, so that they can be picked up and transferred onto the support structure 8 so as to form the storage unit 10.

According to further embodiments not illustrated, the handling machine 6 comprises at least one splitting-up device configured to split up the storage unit 4, before the ceramic articles 2 are transferred from the support structure 5 to the support structure 8. According to some advantageous but non-limiting embodiments, the control unit 23 is also configured to control the handling machine 6.

In accordance with a further aspect of the present invention, a method to handle ceramic articles 2 is also provided, advantageously but not necessarily, implemented by means of the plant 1 to handle ceramic articles 2 described in the foregoing.

Advantageously but not necessarily, the method comprises: a pick-up step, during which at least one storage unit 4 is picked up from a gathering area 3 comprising a plurality of storage units 4 of the type described above, and taken to a re-arranging station 7; a re-arranging step, during which a handling machine 6, which is arranged in the area of the re-arranging station 7, transfers at least part of the ceramic articles 2 of the storage unit 4, in particular all the ceramic articles 2 of the storage unit 4, from the support structure 5 to at least one further support structure 8 so as to obtain at least one storage unit 10, in which the ceramic articles 2 are placed according to the second given arrangement (described above) so that the ceramic articles 2 can each be picked up independently of the others by a holding device 9.

Specifically, advantageously but not necessarily, during such re-arranging step, the ceramic articles 2 are arranged on the support structure 8 in such a way that they are stable on such support structure 8 (in particular, without the help of straps or other locking elements which fasten them to one another and/or to the respective support structure 8) and so that each ceramic article 2 can be grabbed laterally, in particular by a holding device 9 with a horizontal hold.

Advantageously but not limitedly, the method to handle the ceramic articles 2 also comprises a standing step, at least partially subsequent to the re-arranging step, during which at least one storage unit 10 is stored inside an intermediate store 11 (advantageously of the type mentioned above); and a step of composition of an order to be shipped, during which the forming machine 12 takes at least one first ceramic article 2 of the storage unit 10 onto a support structure 13 so as to create a shipment unit 14.

Advantageously but not necessarily, the method comprises a first transfer step, during which a storage unit 10 is transferred, advantageously but not limitedly, by the transfer device 20, from the re-arranging station 7 to the intermediate store 11; and a second transfer step, during which at least one ceramic article 2 of the storage unit 10, in particular a given number of ceramic articles 2 of the storage unit 10, is transferred, advantageously but not limitedly, by the transfer device 21, from the intermediate store 11 to the forming machine 12.

Advantageously but not necessarily, during the second transfer step, the transfer device 21 transfers the storage unit 10 from the intermediate store 11 to the forming machine 12. In this case, advantageously but not necessarily, during the composition step, the forming machine 12 picks up at least one ceramic article 2, or a certain number of ceramic articles 2, from the storage unit 10 and takes it, or them, onto the support structure 13 in order to form the shipping unit 14.

Specifically, when the order to be shipped is a mixed order, i.e. when the shipping unit 14 to be created contains ceramic articles 2 of different types, i.e. having different geometrical (shape and/or dimensions) and/or aesthetic and/or functional characteristics, at least the transfer device 21 and the forming machine 12 are controlled by a control unit 23 (advantageously of the type described above) so as to create such shipping unit 14 comprising a given number of ceramic articles 2 of a first type and a given number of ceramic articles 2a of a second given type, which is different from the first type.

Advantageously but not necessarily, in this case, the method provides for the steps of the method described above to be repeated with a further storage unit 4 comprising a group of ceramic articles 2a of such second type. Specifically, the pick-up step is repeated at least a second time with a further storage unit 4 comprising a group of ceramic articles 2a of the second type; the re-arranging step is repeated with at least part of the ceramic articles 2a of the second type so as to obtain a further storage unit 10a constituted by the ceramic articles 2a of such second type, which are organized so that they can be picked up by a holding device 9; the standing step is repeated with such storage unit 10a constituted by the ceramic articles 2a of such second type; and the second transfer step and the composition step are repeated with at least one of the ceramic articles 2a of such second type so as to obtain the shipping unit 14.

It is understood that the steps of the method can be repeated any number of times, upon the varying of the number of ceramic articles 2 which constitutes the shipping unit 14 and/or the number of types of ceramic articles 2 which is intended to constitute the shipping unit 14 (see FIGS. 3 to 5).

According to further non-limiting embodiments of the method, the method comprises a further transfer step, at least partially preceding the step of composition of an order to be shipped, during which at least one storage unit 4 comprising a group of ceramic articles 2 of a third type, which is different from the first type (and in particular also from the second type), is transferred from the gathering area 3 to a further gathering area 22, which is advantageously of the type described above. In this case, advantageously but not limitedly, the second transfer step also comprises a pick-up sub-step, during which at least one further ceramic article 2 is picked up from the storage unit 4 comprising the ceramic articles 2 of the third type and is transferred to the forming machine 12 to form the shipping unit 14.

According to further embodiments of the method, the standing step comprises a sorting sub-step, during which each storage unit 10 created during the re-arranging step is directed towards one of the intermediate stores 11 or 24 described above, advantageously as a function of the schedule of the orders to be shipped as explained above with reference to the plant 1.

The scope of the present invention has several advantages over the state of the art. These include the following.

The method and the plant 1 to handle ceramic articles 2 of the present invention allow the handling of the ceramic articles 2, and more particularly the process of forming the shipping units 14, to be automated, with consequent advantages in terms of the reduction in the number of operators necessary to carry out the operations described above, and thus in labour costs; in terms of the reduction in the risk of accidents inside the plant 1, since there are fewer operators and the operations that the operators have to carry out are less risky, and in terms of an increase in the precision of the operations thanks to the elimination of human errors. In addition, the method and the plant 1 to handle the ceramic articles 2 of the present invention allow increasing the number of hours of operation of the plant 1 potentially reducing the number of operators with a consequent optimization of productivity.

The invention claimed is:

1. A method to handle ceramic articles; the method comprises:

a pick-up step, during which at least one first storage unit is picked up from a gathering area comprising a plurality of first storage units, each comprising a first support structure and a group of first ceramic articles placed on said first support structure according to a first given arrangement, and taken to a re-arranging station;

a rearranging step, during which a handling machine, which is arranged in the area of the re-arranging station, transfers at least part of the first ceramic articles of the first storage unit from the first support structure to at least one second support structure, so as to obtain at least one second storage unit, in which said at least part of the first ceramic articles is placed according to a second given arrangement, which is different from the first given arrangement;

a standing step, which is at least partially subsequent to said re-arranging step, and during which said at least one second storage unit is stored inside a first intermediate store;

a step of composition of an order to be shipped, during which a forming machine takes at least one first ceramic article from said at least one second storage unit onto a third support structure so as to create a shipment unit;

the forming machine comprising a holding device with a horizontal hold, which grabs said at least one first ceramic article during said composition step;

wherein, during the re-arranging step, said at least part of the first ceramic articles is placed on said second support structure in such a way that each first ceramic article can be grabbed (held) laterally, in particular by said holding device with a horizontal hold, and wherein, in the second given arrangement, said first ceramic articles are arranged with respect to one another in such a way that each first ceramic article has at least two free lateral surfaces (LS), so that it can be grabbed by said holding device with a horizontal hold independently of the others.

2. The method according to claim 1, and comprising:

a first transfer step, during which a first transfer device picks up said at least one second storage unit from the re-arranging station and transfers said at least one second storage unit to said first intermediate store; and a second transfer step, during which a second transfer device transfers said at least one first ceramic article of said at least one second storage unit from said intermediate store to said forming machine.

3. The method according to claim 2, wherein:

during said second transfer step, said second transfer device transfers said at least one second storage unit from said first intermediate store to the forming machine; and said forming machine, during said composition step, picks up said at least one first ceramic article from said at least one second storage unit and takes said at least one first ceramic article onto said third support structure.

4. The method according to claim 2, wherein:

the pick-up step is repeated with a third storage unit comprising a group of second ceramic articles (2a), which are different from said first ceramic articles;

the re-arranging step is repeated with at least part of said second ceramic articles so as to obtain at least a fourth storage unit;

the standing step is repeated with said at least one fourth storage unit;

the second transfer step is repeated with at least one of said second ceramic articles of said at least one fourth storage unit; in particular, said second transfer step is repeated with said at least one fourth storage unit;

the composition step is repeated with at least said at least one of the second ceramic articles of said at least one fourth storage unit;

said second transfer device and said forming machine are controlled by a control unit so as to create said shipment unit comprising a given number of said first ceramic articles and a given number of said second ceramic articles.

5. The method according to claim 1, wherein:

said standing step comprises a sorting sub-step, during which said at least one second storage unit is directed towards said first intermediate store or towards a second intermediate store; more in particular the first intermediate store and the second intermediate store are different areas of a same store.

6. A plant to handle ceramic articles, the plant comprising:

a gathering area comprising a plurality of first storage units, wherein each first storage unit of said first storage units comprising a first support structure and a group of first ceramic articles placed on said first support structure according to a first given arrangement;

a handling machine, which is configured to re-arrange at least part of said first ceramic articles of said group of first ceramic articles on respective second support structures in such a way that they are placed according to a second given arrangement, which is different from the first given arrangement, so as to create a plurality of second storage units;

at least one first intermediate store, which is configured to receive at least a first part of said plurality of second storage units; and a forming machine to form an order to be shipped, which comprises a holding device, which is arranged and configured so as to pick up at least a first ceramic article from at least a second storage unit of said plurality of second storage units and take said at least one first ceramic article onto said third support structure so as to obtain a shipment unit;

the holding device being of the type with a horizontal hold and said second given arrangement being such that said first ceramic articles can be picked up by said holding device, wherein, in said second given arrangement, said first ceramic articles are arranged with respect to one another in such a way that each first ceramic article has at least two free lateral surfaces (LS), so that it can be grabbed by said holding device with a horizontal hold independently of the others.

7. The plant according to claim 6, wherein said forming machine comprises:

a first conveyor device to receive and convey said at least one second storage unit; and a second conveyor device to receive said third support structure and convey said shipment unit towards an output station.

8. The plant according to claim 6, wherein said forming machine comprises a packing device to pack said shipment unit.

9. The plant according to claim 6, further comprising:

a first transfer device to pick up said at least one second storage unit from the re-arranging station and to transfer said at least one second storage unit to said first intermediate store; and a second transfer device to transfer said at least one first ceramic article of said at least one second storage unit from said intermediate store to said forming machine.

10. The plant according to claim 9, further comprising:

a second intermediate store to receive a second part of said plurality of second storage units;

said first transfer device being configured to pick up and transport said at least one second storage unit from said re-arranging station to said first intermediate store or to said second intermediate store;

wherein the first intermediate store and the second intermediate store are different areas of a same store.

11. The plant according to claim 6, further comprising:

a control unit, which is configured to control at least said forming machine and comprises a schedule of the orders to be shipped, which associates each order to be shipped (in particular, each shipment unit) with a shipment day and a composition of ceramic articles to be shipped (in particular, a number and a type of ceramic articles to be shipped).

\* \* \* \* \*